VIDEO AMPLIFIER

Filed July 8, 1959

Inventor
Zbigniew Wiencek
By Hofgren, Brady, Wegner, Allen & Stellman
Attorneys

United States Patent Office 3,070,656

Patented Dec. 25, 1962

3,070,656

VIDEO AMPLIFIER

Zbigniew Wiencek, Rolling Meadows, Ill., assignor to Warwick Manufacturing Corporation, a corporation of Delaware Filed July 8, 1959, Ser. No. 825,701
7 Claims. (Cl. 178—7.5)

This invention relates to transistor amplifier circuits and more particularly to a transistor amplifier particularly designed for the video output or driving stage of a television receiver.

The video output stage of a television receiver is required to deliver a signal having a peak-to-peak voltage of the order of sixty to eighty volts to provide the required drive to the picture tube for desired picture quality. A problem is encountered in designing a transistorized circuit for the video output stage as transistors are not readily available which can handle the voltages required. Occasionally a "freak" may be found which will operate as a single element output stage, but a commercial circuit cannot be designed for hand selected components.

I have devised and disclose and claim herein a novel transistor amplifier circuit which is suitable for the video output stage of the television receiver.

A principal object of the invention is to provide an improved transistor amplifier circuit which will deliver the video drive signal for a television receiver without requiring specially selected components.

A more specific object of the invention is the provision of an amplifier comprising a first transistor having an output circuit, a second transistor having an output circuit with the output circuits connected in series, and a load connected in push-pull relation with the output circuits.

Another object is the provision of an amplifier circuit including a first transistor, a second transistor connected with the first in a stacked amplifier circuit and driven by the output of the first transistor, and a load connected in push-pull relation across the transistors. Yet a further object is the provision of such an amplifier utilizing a first transistor having an alpha cutoff of the order of thirty megacycles and a second transistor having an alpha cutoff of the order of at least three megacycles.

Still another object is the provision of an amplifier including a first transistor having an emitter-collector output circuit, a second transistor having an emitter-collector output circuit connected in the emitter-collector circuit of the first transistor, a source of signal connected with the first transistor, and a load connected across the emitter-collector output circuits. And a further object is to use such an amplifier in a television receiver with the grid-cathode or screen-cathode circuit of the cathode-ray tube connected as a push-pull load across the output circuits.

Further objects and advantages will become apparent from the following detailed description taken in connection with the accompanying drawings, in which.

Figures 1, 2:
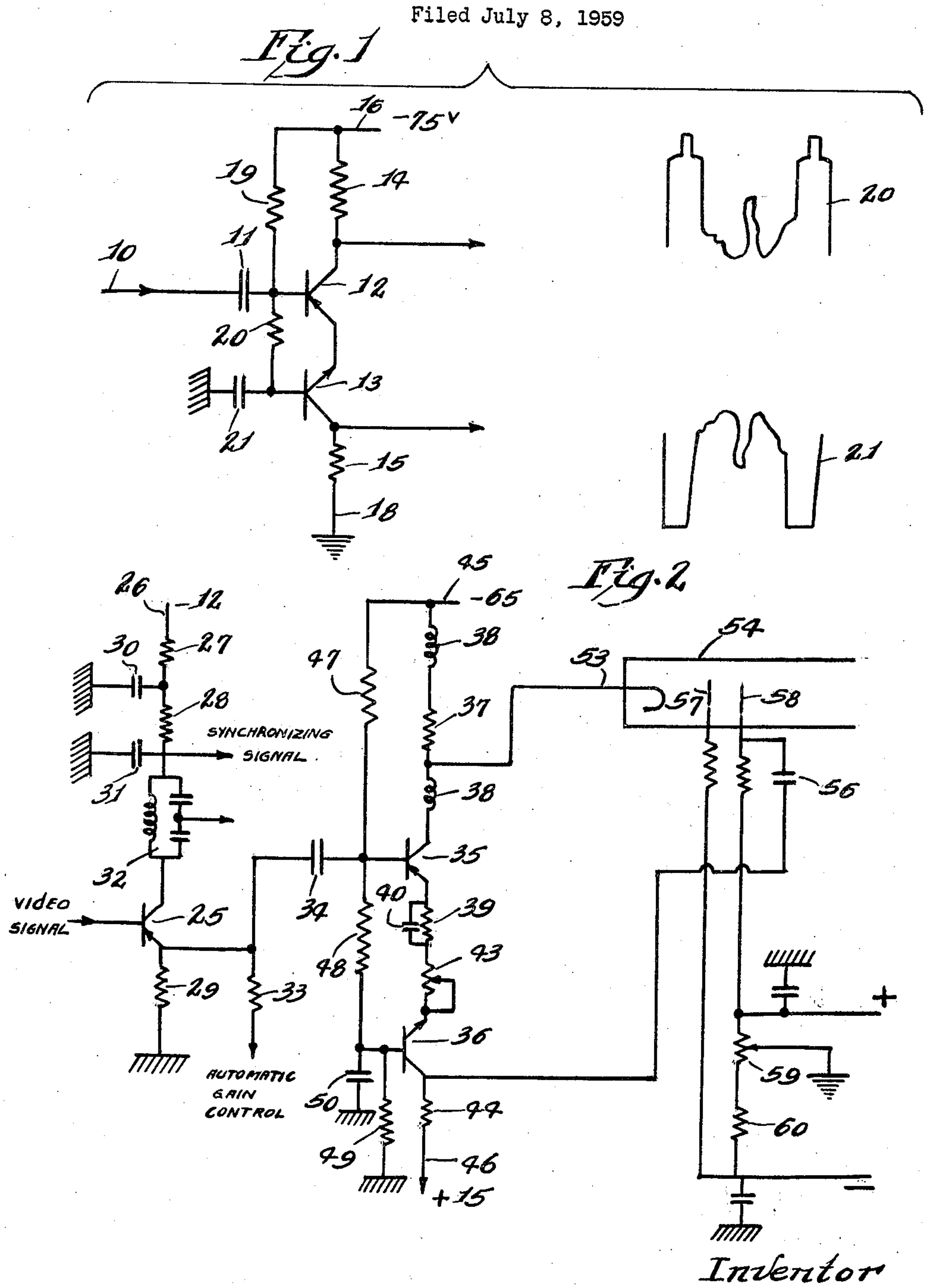
FIGURE 1 is a schematic diagram of an embodiment of the invention.
FIGURE 2 is a schematic diagram of another embodiment of the invention.

While this invention is susceptible of embodiments in many different forms, there is shown in the drawings and will herein be described in detail an embodiment of the invention with the understanding that the present disclosure is to be considered as an exemplification of the principles of the invention and is not intended to limit the inventon to the embodiment illustrated. The scope of the invention will be pointed out in the appended claims.

The amplifier circuit disclosed herein is particularly designed as the video output stage of a television receiver. However, it may find use in other situations requiring wide band width and a high peak-to-peak voltage output. During the course of the detailed description of the invention specific circuits will be described and values and component types assigned to the various elements. These values and types are intended to be exemplary of an operative embodiment of the invention and many changes will be apperent to those skilled in the art. None of the values or component types are to be considered critical unless so indicated.

Turning now to FIGURE 1, a simplified embodiment of the invention is illustrated. A video input signal, preferably having an amplitude of the order of 1.5 volts peak-to-peak, is applied to input terminal 10 and coupled through capacitor 11, 2 $\mu$f., to the base of transistor 12, a type 2N247 PNP transistor, connected for grounded emitter operation. A second transistor 13, type 2N204A NPN transistor, has an emitter-collector circuit connected in series with the emitter-collector circuit of transistor 12 with the emitter elements connected directly together, forming what may be called a "stacked" amplifier. The emitter-collector circuits of the two transistors are completed through resistor 14, 5600 ohms, connected in series with the collector of transistor 12 and resistor 15, 3900 ohms, connected in the circuit of the collector of transistor 13. The collector-emitter circuits are connected between a source 16 of negative potential of the order of 75 volts and a reference potential or ground 18. The bias circuitry for the amplifier is completed with resistor 19, 270,000 ohms, connected between the negative source 16 and the base of transistor 12, and resistor 20, 15,000 ohms, connected between the base elements of the two transistors. A by-pass capacitor 21, 50 $\mu$f., is connected from the base of transistor 13 to ground. The output from the amplifier is derived across the two transistors and may be coupled directly to the grid or screen and the cathode of the cathode-ray tube (not shown) in what is essentially a push-pull driving arrangement.

The video signal is amplified in transistor 12 which serves as a current generator, with the output current being injected into the emitter circuit of transistor 13. The lower transistor serves primarily as a voltage amplifier. The output of the amplifier is indicated by the wave forms at the right of FIGURE 1 with wave form 20 representing the signal derived from the collector of transistor 12 and wave form 21 indicating the output of transistor 13. It will be noted that the two output signals are opposite in polarity, resulting in the push-pull operation. In the specific example given the wave form 20 may have peak-to-peak amplitude of the order of 40 volts while wave form 21 has a peak-to-peak amplitude of the order of 35 volts, providing adequate drive for the cathode-ray tube of a television receiver. The operating point for the transistors, which is determined by the constants of the bias network, is selected so that the cathode signal derived from transistor 12 is D.C. restored in the base of transistor 12 and has positive going synchronizing pulses at the collector. The synchronizing pulses are clipped from the negative going output of transistor 13.

Current amplifier input transistor 12 requires a good high frequency characteristic for television work and should have an alpha cutoff of the order of 30 megacycles. Transistor 13 is not so critical and may have an alpha cutoff of the order of three megacycles.

The circuit illustrated has relatively high emitter loading for the transistors and as a result has good thermal stability. The input capacitance of the amplifier circuit is of the order of 10 $\mu\mu$f., as compared with the 200 $\mu\mu$f. input capacitance of a single transistor. As a result the video driver circuit which supplies the amplifier may have only relatively simple isolation; for example, only one emitter follower stage need be used with the circuit of FIGURE 1.

The circuit described above has several features which impair its usefulness in a commercial television receiver including a marked variation in picture resolution with a variation in the video drive level, a strong compression of white with maximum drive, and the fact that the operating points of the transistors are rather critical. FIGURE 2 illustrates a modified circuit which eliminates or reduces these objections.

The output of the video detector stage (not shown) is connected to the base of transistor 25, a type 2N218 PNP transistor, connected in an emitter follower circuit. Transistor 25 is operated from a 12 volt negative supply 26 through a network including resistors 27, 100 ohms and 28, 2700 ohms, connected in the collector circuit and resistor 29, 1000 ohms, connected in the emitter circuit. Decoupling capacitors 30, 0.01 $\mu$f. and 31, 150 $\mu\mu$f. are connected across resistors 27 and 28, respectively. The audio signal is obtained from a network 32 connected in the collector circuit while the synchronizing signal is derived across resistors 27 and 28. An automatic gain control potential for the radio frequency and intermediate frequency amplifiers of the receiver is derived from the emitter circuit through resistor 33.

The video signal is coupled through capacitor 34, 12 $\mu$f., from the emitter of transistor 25 to the base of transistor 35, an X521 (Sylvania) PNP transistor. The stacked amplifier circuit is completed by transistor 36, a 2N94 NPN transistor. Basically the connection of the transistors 35 and 36 is identical with that of FIGURE 1. The collector circuit of transistor 35 includes resistor 37, 6800 ohms, and a pair of peaking coils 38 which establish the desired frequency response for the circuit. The emitters of transistors 35 and 36 are connected together through resistor 39, 47 ohms, shunted by capacitor 40, 0.01 $\mu$f., and a series connected variable resistor 43, 250 ohms, which serves as a contrast control by varying the drive to transistor 36. The emitter-collector circuit of transistors 35 and 36 is completed through resistor 44, 4700 ohms, and the entire network is connected between a negative source 45, −65 volts, and the positive source 46, 15 volts. A further bias network connected from negative source 45 includes resistor 47 of 220,000 ohms, connected between source 45 and the base of transistor 35, resistor 48, 10,000 ohms, connected between the bases of the two transistors and resistor 49, 82,000 ohms, connected from the base of transistor 36 to ground. Capacitor 50, 25 $\mu$f, shunts resistor 49. The positive going video signal from the collector circuit of transistor 35 is connected with the cathode 53 of a cathode-ray tube 54. The negative going signal from the collector of transistor 36 is connected through D.C. blocking capacitor 56, 0.05 $\mu$f., with a control element 58, here the screen grid, of the cathode-ray tube. A voltage divider comprising resistors 59 and 60 is connected across a source of potential with a variable tap on resistor 59 connected to ground providing a brightness control.

The contrast control 43, which varies only the current drive to transistor 36, provides a wide range of contrast settings without adversely affecting the resolution of the picture. Furthermore, the compression of the white on maximum drive noted in connection with the circuit of FIGURE 1 is reduced. In addition, the operating points of transistors 35 and 36 are not as critical as the operating points of transistors 12 and 13 in the circuit of FIGURE 1.

I claim:

1. A broad band amplifier circuit comprising: first and second semi-conductor devices of opposite conductivity type having emitter, base and collector electrodes; a first impedance connected to one collector electrode; a second impedance connected to the other collector electrode; a source of uni-directional potential coupling said first and second impedances; a variable impedance coupled between said emitter electrodes and forming a series circuit with said devices, impedances, and source; means connected to said source for establishing proper operating bias in said devices; input means coupled to one of said base electrodes for supplying a signal to be amplified; and output terminals connected to said collector electrodes.

2. A broad band amplifier circuit comprising: first and second semi-conductor devices of opposite conductivity type having emitter, base and collector electrodes; a first impedance connected to one collector electrode; a second impedance connected to the other collector electrode; a source of uni-directional potential coupling said first and second impedances; a variable impedance coupled between said emitter electrodes and forming a series circuit with said devices, impedances, and source; means including a biasing impedance coupled between said base electrodes connected to said source for establishing proper operating bias in said devices; input means coupled to one of said base electrodes for supplying a signal to be amplified; and output terminals connected to said collector electrodes.

3. In a television signal receiving set including a video signal detecting circuit and a cathode ray tube for displaying a television picture, a video amplifier and phase splitting network comprising: a first semi-conductor device of the PNP type including base, emitter and collector electrodes; a second semi-conductor device of the NPN type including base, emitter and collector electrodes; a source of energizing potential including positive and negative terminals and a point of reference potential; a first impedance connected between one of said collector electrodes and said positive terminal of said source, a second impedance connected between the other of said collector electrodes and the negative terminal of said source; output means for connecting said collectors to said cathode ray tube; an input circuit coupled between said detecting circuit and one of said base electrodes; a biasing network including an impedance connected between said base electrodes coupled to said source; and a variable impedance connected between said emitter electrodes for providing a contrast control for said cathode ray tube.

4. The device as claimed in claim 3 wherein said impedance connected between said emitter electrodes is a variable resistor.

5. The device as claimed in claim 3 wherein the impedance connected between said emitter electrodes includes a variable resistor connected to a parallel network consisting of a resistor and a capacitor.

6. The device as claimed in claim 3 wherein the biasing network includes a first resistance connected between the negative terminal of said source and the base electrode of said PNP device, a second resistor connected between said base electrodes and a third resistor connected to the base of said NPN device and said point of reference potential.

7. In a television signal receiving set including an image display device and a demodulation circuit, a video amplifier comprising: a series circuit including first and second transistors of opposite conductivity type having collector, base and emitter terminals, means including a variable impedance coupling said emitters for varying the gain of said transistors, a first impedance connected to one collector electrode, a second impedance connected to said other collector electrode, and a source of uni-directional potential coupling said first and second impedances; means connecting said collector electrodes to said image display device; and bias means including an input circuit coupled to said demodulation circuit for providing proper operating potentials for said transistors and for supplying a signal to be displayed.

References Cited in the file of this patent

UNITED STATES PATENTS

| | | |
|---|---|---|
| 2,745,038 | Sziklai | May 8, 1956 |
| 2,832,846 | Waldhauer | Apr. 29, 1958 |
| 2,860,195 | Stanley | Nov. 11, 1958 |
| 2,863,008 | Keonjian | Dec. 2, 1958 |
| 2,906,817 | Kidd | Sept. 29, 1959 |
| 2,920,189 | Holmes | Jan. 5, 1960 |

OTHER REFERENCES

RCA TN No. 36: "Transistor Audio Frequency Amplifier," by Aronson and Putzrath.